Nov. 26, 1957 J. W. GARTLAND 2,814,076
SULPHUR SEQUESTRATION OF HIGH SULPHUR COKE
Filed Oct. 27, 1953

INVENTOR.
JOSEPH W. GARTLAND
BY Herbert J. Evers
ATTORNEY

United States Patent Office 2,814,076
Patented Nov. 26, 1957

2,814,076

SULPHUR SEQUESTRATION OF HIGH SULPHUR COKE

Joseph W. Gartland, Lakewood, Ohio, assignor to Union Carbide Corporation, a corporation of New York Application October 27, 1953, Serial No. 388,665

8 Claims. (Cl. 18—54.7)

This invention relates to a method of improving the graphitization of carbons formed from high sulphur cokes, and more particularly concerns improved methods of sulphur sequestration and puffing inhibition of high sulphur cokes.

Most commercial petroleum contents contain green carbon articles having high sulphur content, that is, above 1%, as an impurity in the form of complex compounds of sulphur and carbon. These carbon sulphur complexes are stable during normal calcining and baking operations at 1000° to 1300° C., but break up abruptly upon heating above 1500° C. Thus, formed carbons having a high sulphur content when subjected to relatively high graphitization temperatures, will effect rapid volatilization and liberation of the sulphur upon approaching or passing through the critical temperature of 1500° C. The rapid liberation of the contained sulphur is accompanied by a cracking and shattering of the carbon bake structure and an increase in its volume, commonly referred to as puffing. This expanded volume may under certain circumstances amount to as much as 20% to 25% of its original volume.

Heretofore, such difficulties were obviated by adding salts or oxides of sulphide forming metals, such as iron, manganese, aluminum or calcium, iron being most common, to the carbon shape during the carbon bake to sequester the contained sulphur and decrease its rate of evolution from the carbon shape. While effective to a degree in sequestering sulphur and inhibiting volumetric expansion of the carbon shape, the introduction of these materials presents new problems, one serious disadvantage arising out of this practice being the difficulty in effectively removing the metal from the graphite bake. In addition, when iron or other heavy metals are used as sequestration agents, upon completion of the bake, residual percentages of iron of the order of 1% remain in the graphite article. Since iron is a catalyst for the oxidation of graphite, it is a highly undesirable contaminant. Also, for certain applications in which product purity is an important consideration, and in particular where large formed carbon shapes are involved, purification of the carbon bakes can only be accomplished by costly sustained heating at temperatures above 3000° C.

To the end that the above difficulty may be resolved, the present invention contemplates an improved method of sequestering sulphur from a high sulphur coke without the above attendant disruptive and expansive effects usually encountered in the prior art, wherein a method is employed for restraining the rate of escape of vaporized sulphur from the carbon bake and suppressing the tendency for expansion of the carbon form during such vaporization, thereby achieving a homogeneous graphitized carbon shape displaying the characteristics of high density and high purity throughout its structure.

It is, therefore, an important object of the present invention to provide in a carbonaceous article formed from high sulphur coke, an improved anti-puffing agent which will facilitate removal of most of the sulphur content during a carbon bake without impairing the structure of the baked article and permit only a slight expansion of said baked article during the liberation of the contained sulphur.

Another important object of the present invention is to provide in a carbonaceous mix having a high sulphur content, an improved method of sequestering the sulphur content during the carbon bake to avoid undue expansion of the carbon article as a result of gaseous evolvement of sulphur, and to increase the real density of the finished carbon article.

Other objects, features and advantages of the present invention will be apparent from a detailed description of certain preferred embodiments thereof taken in conjunction with the drawings in which.

Figure 1:
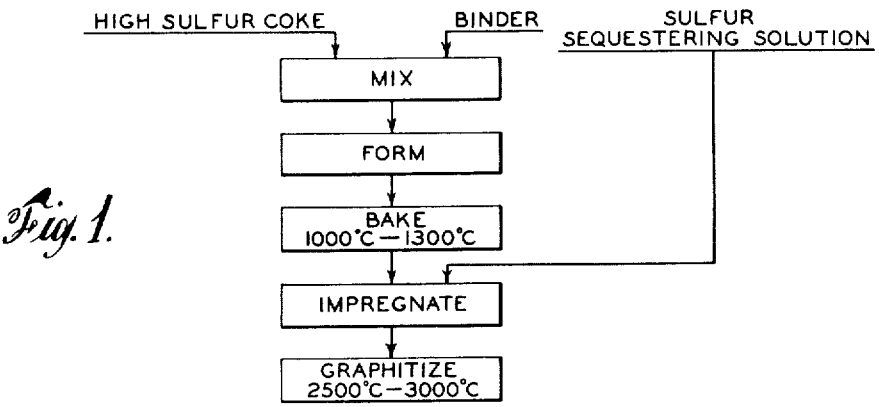
Fig. 1 is a flow diagram embodying the principles of the present invention.

For the accomplishment of the above objects, green carbon is formed in the usual manner of high sulphur carbon stock and binder material, and extruded into the desired shape, such as an electrode, and heated in a conventional baking furnace. Referring to Fig. 1 the green carbon electrode is first subjected to a preliminary heating stage which generally occurs at a relatively low baking temperature in the range between 1000° C. and 1300° C. to eliminate hydrocarbons and completely carbonize the binder material. In this temperature range, the complex compounds of sulphur and carbon are highly stable and offer little complication in the manufacture of formed carbon shapes.

After completion of the carbonization of the binder material, the carbon shape is ordinarily graphitized and the carbon bake completed at a higher temperature range. For graphitizing the carbon shape, the furnace temperature is preferably raised to between 2500° C. and 3000° C. Inasmuch as the complex sulphur and carbon compound contained in the carbon shapes are rapidly thermally decomposed and vaporized at temperatures above 1500° C., the present invention provides an improved method of sequestering the contained sulphur. This is attained by adding a sequestering agent which, when combined with sulphur, is volatizable at temperatures ordinarily encountered in the graphitization of a carbonaceous product.

In practice, after completing the carbonization of the binder material in the preliminary bake, the carbon form may be impregnated with a sulphur sequestering material, as for example by immersion in an aqueous solution of a salt of an alkali metal from group I of the periodic table, preferably sodium carbonate. Upon the addition of the proper amount of sequestering material, two parts of sodium carbonate to one hundred parts of carbon coke having been found to be satisfactory, the baking operation is resumed at the graphitization forming stage, ranging from 2500° C. to 3000° C. Here, the aforementioned alkali metal additives are readily volatized and removed from the carbon form along with part of the sequestered sulphur.

Sodium carbonate possesses an added advantage over prior art sequestering agents in that its vaporization pressure is relatively higher, thereby allowing it to remain in association with the high sulphur coke for a sufficient length of time to efficiently perform its sequestration function. As a consequence, a greater amount of contained sulphur is sequestered and the expansion of the carbon shape is inhibited. In addition, the special attraction of sodium carbonate for sulphur effectively contains the thermally unstable sulphur compounds formed above 1500° C. within the carbon, and permits the major portion of the contained sulphur to be removed along with the vaporized sodium carbonate at about 1800° C., with the result that a higher purity graphite product is obtained without the usual side effects of puffing, undue porosity, and low real density.

In lieu of applying the sequestration agent as an aqueous solution and impregnating the carbon shape therewith, the sequestration agent may, if so desired, be applied in powder form to the carbon mix to accomplish substantially the same results. For instance, referring to Fig. 2 using powdered sodium carbonate as a sequestration agent, one method of producing a suitable admixture might be to blend the powdered sodium carbonate with coke particles and pitch binder in the mixing operation preceding forming, and gradually heat the carbon form through the carbonization and graphitization temperature ranges specified hereinabove so as to carbonize the binder material and convert the carbon to its graphite phase in the same manner as described hereinabove.

Figure 3:
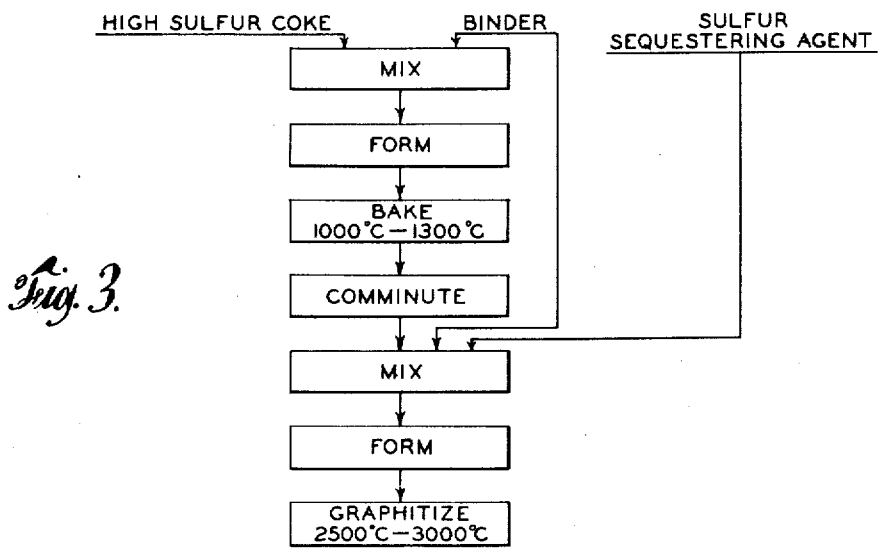
Fig. 3 is a flow diagram showing another modification of the method of the present invention.

Referring to Fig. 3, another method for accomplishing substantially the same result might be to administer the dry powdered sodium carbonate to the carbon shape after the preliminary bake. In practicing this method, the prebaked shape is reduced to a powder form and mixed with the sodium carbonate and additional binder, and the mix is then re-formed and graphitized in the manner above described.

Figure 2:
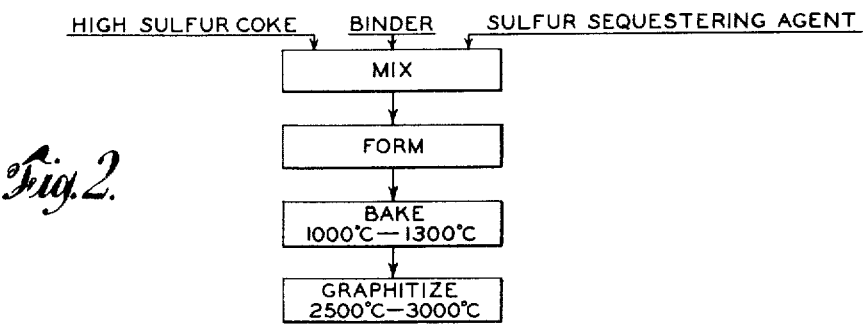
Fig. 2 is a flow diagram showing a modification of the method of the present invention.

The preferred method for practicing the invention illustrated in Fig. 2 is to form the carbon shape from a mixture of previously semi-baked coke and coke flour particles, binder and dry sodium carbonate, and after forming the desired carbon shape as by extrusion, subjecting the carbon shape to the usual baking procedures.

As an example of the practice of the present invention the following comparative data in Table I illustrate the action of sodium carbonate upon incorporating in a high sulphur coke with an initial sulphur content of 1.65% and after heating to 2200° C.

Table I

| Sequestering Agent, Grams/100 Grams Coke | Percent Volume Increase | Real Density, Grams/cc. | Percent Sulphur Remaining |
|---|---|---|---|
| none | 20.5 | 1.83 | 0.28 |
| 2 parts sodium carbonate | 4.1 | 2.13 | 0.27 |

From the above table it is readily apparent that the absence of a sequestering agent in the carbon bake results in a rapid volatization of the sulphur compounds starting at 1550° C., the result being a substantially puffed carbon baked article having a volume increase amounting to 20.5% of the original green carbon volume.

Where, however, sodium carbonate is used as a sequestering agent, it is especially adapted as an inhibiting agent for the production of closely controlled high purity graphite compositions. This special additive not only delays the rapid escape of sulphur but, because of its low volatization temperature of approximately 1800° C., allows substantial amounts of the contained sulphur to be carried along with the vaporized fumes. Thus, through the mechanics of sodium carbonate operating as both a sequestering agent and a puffing inhibiting agent, there is consummated a carbon baked article having a volumetric expansion of 4.1%, a real density of 2.13 grams/cc. and a remaining sulphur content of 0.27%, this being accomplished without a costly high temperature bake to remove the sodium from the graphitized article.

It will be understood modifications and variations may be effected without departing from the spirit and scope of the present invention.

What is claimed is:

1. A method of producing graphite articles from a green carbonaceous shape having a high sulphur coke content comprising heating said sulphur containing shape between 1000°–1500° C., adding a sulphide forming sequestering and expansion inhibiting agent comprising an alkali metal compound from group I of the periodic table to said shape, and heating said shape at graphitization temperatures up to 2500° C.–3000° C. to purge said shape of its contained sulphur and metallic additive, thereby reducing the expansion of said shape during graphitization thereof due to escaping sulphides.

2. A method of sequestering sulphur from a molded or extruded green carbon article of high sulphur content comprising baking the green carbon and carbonizing the carbon binder, adding a salt of an alkali metal from group I of the periodic table to form a compound of such metal with the contained sulphur, and slowly vaporizing said compound at graphitization temperatures, whereby volumetric increase of the carbon bake is impeded, a major portion of the sulphur is removed, and a low sulphur, high density graphite article is obtained.

3. A method of sequestering sulphur from a carbonaceous article having normal binder content and a high sulphur content comprising heating said article at a temperature below 1500° C. to carbonize said binder, impregnating the article with an aqueous solution of sodium carbonate to form metallic sulphides, and heating said article to a graphitizing temperature between 2500° C–3000° C. to vaporize said sulphides, thereby impeding the disruptive expansive effects of the liberated sulphur, and effecting the formation of a low sulphur, high density carbon article.

4. A method of sequestering sulphur from a carbonaceous article having normal binder content and a high sulphur content comprising heating said article at a temperature below 1300° C. to carbonize said bonder, impregnating the article with an aqueous solution of sodium carbonate to form metallic sulphides, and heating said article to a graphitizing temperature between 2500°–3000° C. to vaporize said sulphides, thereby impeding the disruptive expansive effects of the liberated sulphur, and effecting the formation of a low sulphur, high density carbon article.

5. In the manufacture of graphitized carbon bodies which comprises preparing a carbonaceous mix composed of finely divided carbonaceous material including a material containing undesirable quantities of sulphur and a carbonizable binder, forming said mix into a desired shape, baking the shaped article so produced to carbonize said binder and then baking said article to graphitize it, the improvement which comprises impregnating said shaped article with a compound of an alkali metal having a vaporization point within the graphitization temperatures to be encountered after said first baking operation whereby to temporarily sequester the sulphur in said mix and to inhibit substantial puffing of said article by evolution of sulphur therefrom during said graphitizing baking operation.

6. A method of producing low sulpuhur graphite articles from a high sulphur containing carbonaceous shape comprising admixing a sulphide forming sequestering and expansion inhibiting agent comprising a powdered alkali metal salt from Group I of the periodic table, forming the admixture into the desired shape, and heating said shape at graphitization temperatures up to 2500° C.–3000° C. to purge said shape of its containing sulphur and alkali metal salt additive, thereby reducing the expansion of said shape during graphitization thereof due to escaping sulphides.

7. A method of producing low sulphur graphite articles from a high sulphur containing carbonaceous shape comprising heating said sulphur containing shape between 1000°–1500° C., admixing a sulphide forming sequestering and expansion inhibiting agent comprising a powdered alkali metal salt from Group I of the periodic table, forming the admixture into the desired shape, and heating said shape at graphitization temperatures up to 2500° C.–3000° C. to purge said shape of its containing sulphur and metallic additive, thereby reducing the expansion of said shape during graphitization thereof due to escaping sulphides.

8. A method of producing graphite articles from a high sulphur containing carbonaceous shape comprising heating said sulphur containing shape between 1000°–1500° C., reducing said shape into a powder, admixing a sulphide forming sequestering and expansion inhibiting agent comprising an alkali metal salt from group I of the periodic table with the resulting powder, forming the powder mixture into the desired article form, and heating said article at graphitization temperatures up to 2500 C.–3000° C. to purge said article of its containing sulphur and metallic additive, thereby reducing the expansion of said article during graphitization thereof due to escaping sulphides.

References Cited in the file of this patent
UNITED STATES PATENTS

| | | |
|---|---|---|
| 598,646 | Saunders | Feb. 8, 1898 |
| 1,000,761 | Snyder | Aug. 15, 1911 |

U. S. DEPARTMENT OF COMMERCE
PATENT OFFICE
CERTIFICATE OF CORRECTION

Patent No. 2,814,076                                                                                            November 26, 1957

Joseph W. Gartland

It is hereby certified that error appears in the printed specification of the above numbered patent requiring correction and that the said Letters Patent should read as corrected below.

Column 1, line 18, after "of" insert -- green carbon articles having --; line 19, for "cokes" read -- content --; lines 20 and 21, for "Most commercial petroleum contents contain green carbon articles having high sulphur content, that is, above" read -- Most commercial petroleum cokes contain a high sulphur content, that is, above --.

Signed and sealed this 18th day of March 1958.

(SEAL)
Attest:
KARL H. AXLINE
Attesting Officer

ROBERT C. WATSON
                                                                           Commissioner of Patents